United States Patent
Elder et al.

[11] 3,764,151
[45] Oct. 9, 1973

[54] JOINT FOR CAST CONCRETE SECTIONS

[75] Inventors: Clarence H. Elder, Dune Acres, Ind.; Leonard L. Jugle, Elmhurst, Ill.

[73] Assignee: Condux International Inc., Naperville, Ill.

[22] Filed: May 8, 1972

[21] Appl. No.: 251,799

Related U.S. Application Data

[63] Continuation-in-part of Ser. No. 41,439, May 22, 1970, abandoned.

[52] U.S. Cl. .......... 277/207 A, 138/111, 285/137 R
[51] Int. Cl. ............................................ F16j 15/02
[58] Field of Search ................ 285/230, 231, 137 R, 285/347, 345; 138/111, 112, 174; 277/207

[56] References Cited
UNITED STATES PATENTS

| | | | |
|---|---|---|---|
| 388,442 | 8/1888 | Phipps............................ | 285/137 R |
| 2,890,899 | 6/1959 | Simmons et al................ | 285/137 R |
| 3,135,519 | 6/1964 | Ligon et al. ..................... | 277/207 B |
| 3,163,448 | 12/1964 | Franklin.......................... | 285/137 R |
| 3,185,490 | 5/1965 | Gagne.............................. | 277/207 A |

Primary Examiner—George E. Lowrance
Assistant Examiner—Robert I. Smith
Attorney—Richard C. Lindberg

[57] ABSTRACT

Milti-bore concrete sections of the bell and spigot type are formed integrally with preformed end liners or inserts. These are formed either by a vacuum process of by injection moulding and are placed at the spigot and bell ends of the sections. When the sections are laid in end-to-end relationship, an annular cavity is provided to receive a premoulded gasket or seal which can be compressed between the bell and spigot ends to form a tight seal against ingress of water to the bores of the connected sections. The liners form chamfers at the ends of the bores making it unnecessary to smooth the concrete thereat for the reception of sheathed cable strung through the connected bores. The liners are provided with structure for firmly anchoring the same to the concrete, and are rigid enough to resist deformation when the concrete is expressed from the mould in which it is formed.

4 Claims, 10 Drawing Figures

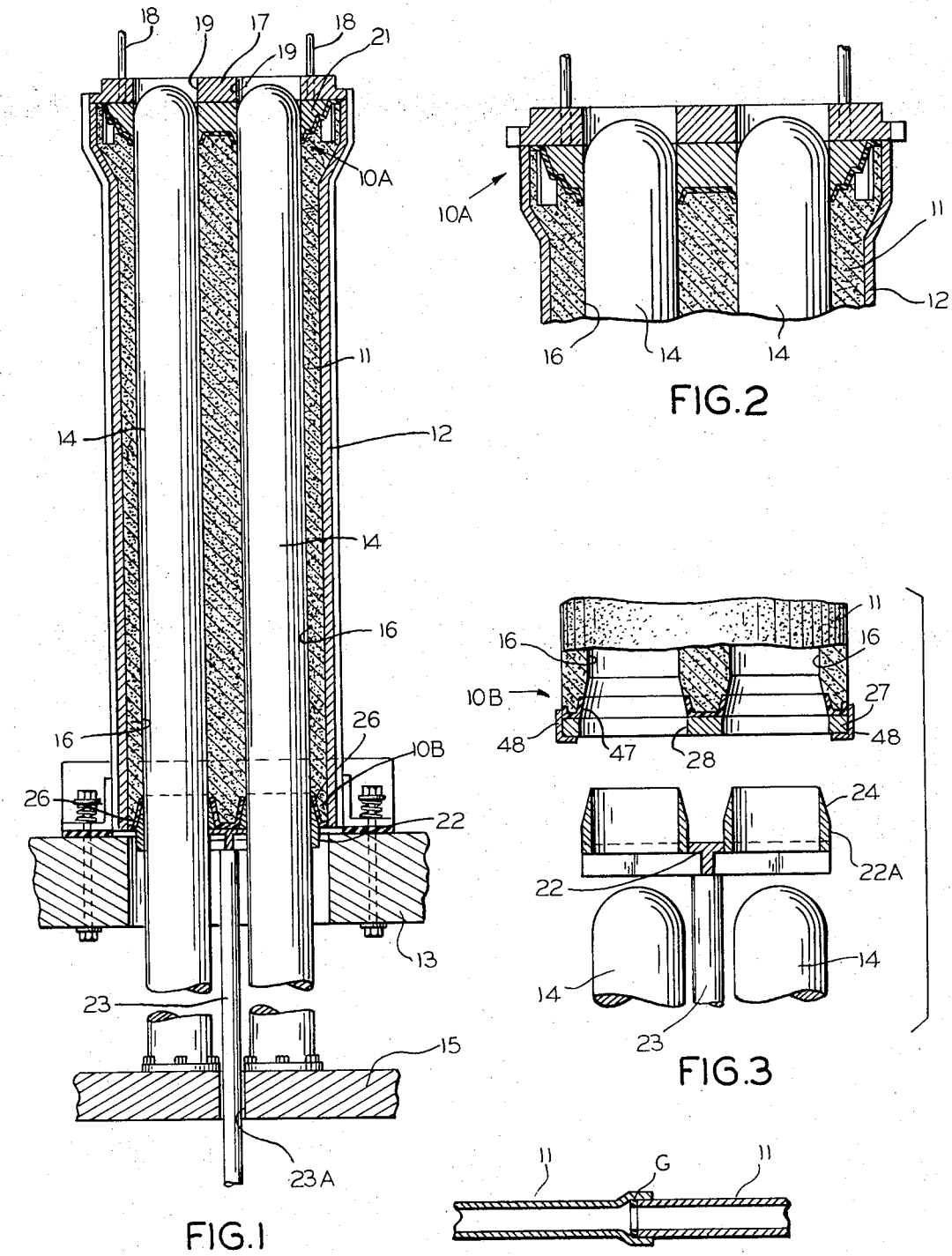

JOINT FOR CAST CONCRETE SECTIONS

This application is a continuation-in-part of our application Ser. No. 41,439, filed May 22, 1970 and now abandoned, for CONDUIT SECTIONS HAVING INTEGRALLY MOULDED LINERS IN GASKET SEATS.

BACKGROUND OF THE INVENTION

This invention relates to an improved joint for sealing concrete sections laid in end-to-end relationship

THE PRIOR ART

The structures according to the present invention find special application with conduit sections of the type as disclosed in and as formed by apparatus disclosed in Gagne U.S. Pat. Nos. 2,994,119; 3,000,070; and 3,001,260. The conduit sections shown therein may be adapted to be sealed against the entrance of water by a seal as shown in Gagne United States Patent No. 3,185,490.

SUMMARY OF THE INVENTION

The structure according to the present invention makes it possible to form bell and spigot multi-bore concrete sections with smooth ends for the reception between connected sections of sealing members or gaskets tightly sealed to the ends of the connected sections, together with chamfers at the ends of the bores making it unnecessary to grind the bore ends after expressing the sections from the mould.

THE DRAWINGS

FIG. 1 is a vertical sectional view through structure for forming a multi-bore concrete section, the section having the improvements according to the present invention embodied therein;

FIG. 2 is an enlarged vertical sectional view through the bell end of the section seen in FIG. 1, showing details of the insert according to the present invention;

FIG. 3 is an enlarged sectional view of the spigot end of the section seen in FIG. 1, showing details of the insert thereat and the manner in which the same cooperates with structure for expressing a concrete section from the structure of FIG. 1;

FIG. 4 is a schematic view showing how the improved sections may be connected in end-to-end relationship;

Figures 5, 6:
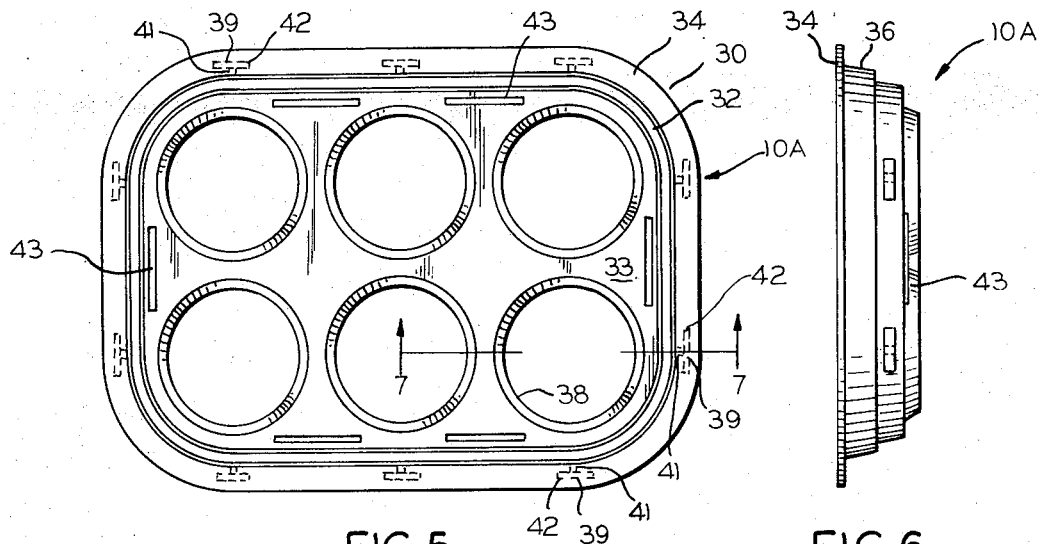
FIG. 5 is a plan view of the insert for the bell end of the concrete section.
FIG. 6 is an end elevational view thereof.

The improved inserts forming part of the improved joint according to the present invention are denoted generally by the reference numerals 10A and 10B and include a bell end insert 10A and a spigot end insert 10B. Inserts 10A and 10B are moulded integrally with a multi-bore bell and spigot concrete section 11 in a mould 12 resting upon a stage 13 and secured thereto in any convenient fashion. Mould 12 may be constructed in accordance with one or more of the aforesaid Gagne patents and a plurality of bore shaping members 14 extend longitudinally of mould 12 to form a plurality of bores 16 in section 11. Bore shaping members are mounted on a stage 15 which is movable up and down, so that the bore forming members 14 can move through a mass of concrete to be moulded in mould 12.

The upper end of mould 12 has an upper mould closing pressure platen 17 cooperating with locating and pressure applying members 18. Pressure platen 17 has a plurality of openings 19 therein through which the bore shaping members 14 extend during the moulding process. An under pressure member 21 extends down from pressure platen 17 and is configured to receive bell end insert 10A.

The lower end of the mould 12 is closed by a lower pressure platen 22 mounted on a pressure applying member 23. An opening 23A in stage 15 for pressure applying member 23 enables the same to move relative to members 14 to express a moulded section 11 from mould 12, pressure being applied to the latter in any convenient manner. The lower pressure platen 22 has cylindrical extensions 22A therefrom, the inner diameter thereof conforming to the diameter of the bore shaping members 14. The outer surface of the cylindrical extension 22A is tapered as at 24 to form chamfers 26 at the spigot end of the bores 16 formed in the concrete section 11.

A transfer platen 27 is supported on the lower pressure platen 22 during the compression of the concrete mass within the mould 11, and is separable therefrom as seen in FIG. 3, the transfer platen 27 having bores 28 therein corresponding to the diameter of the cylindrical extension 22A from the lower pressure platen 22. Transfer platen 27 rests upon the lower pressure platen 22, and is of a dimension corresponding to the inner dimensions of the mould 12, so that the transfer platen may enter the mould 12 during the compacting process.

Transfer platen 27 and the lower pressure platen 22 are arranged to support the spigot end insert 10B during the moulding process, the latter being embedded in the mass of concrete compacted within the mould 12.

As is taught in the aforesaid Gagne patents, pressure against the lower pressure platen 22 and the upper pressure platen 17 compacts a mass of concrete within the mould 12, the latter being vibrated in a manner as may be taught by the aforesaid Gagne patent.

Figure 7:
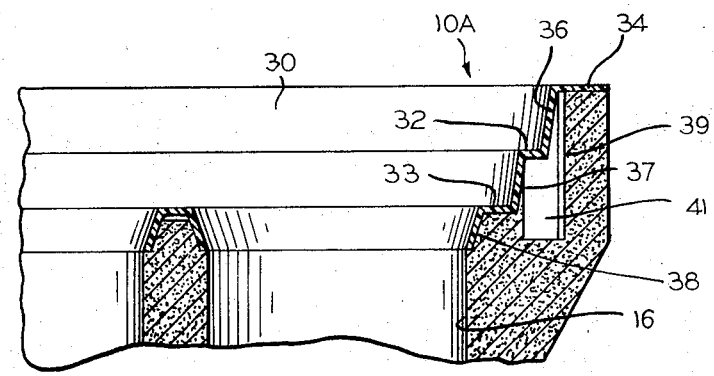
FIG. 7 is a section taken along the line 7—7 of FIG. 5 looking in the direction of the arrows.

Referring now particularly to FIGS. 5 through 7 of the drawings, the bell end insert 10A includes a body member 30 having a plurality of planar sections 32 and 33 and a flange section 34, planar section 32 and flange section 34 being connected by a generally annular web 36. In the same fashion, planar surfaces 32 and 33 are connected by a generally annular web 37. Planar surface 33 has frusto-conical sections 38 extending therefrom, the smaller diameter thereof conforming to the diameter of a bore forming member 14.

Structure is provided for locking insert 10A into the concrete mass, and to this end the flanges 37 and 36 are moulded integrally with a T-shaped member 39 extending laterally of the leg 41 into the concrete mass.

Additionally, the insert 10A may be formed with depressions 43 in the planar surface 33, such depressions extending into the concrete mass, additionally to assist in the embodiment of the insert 10A into the concrete mass.

Figure 8:
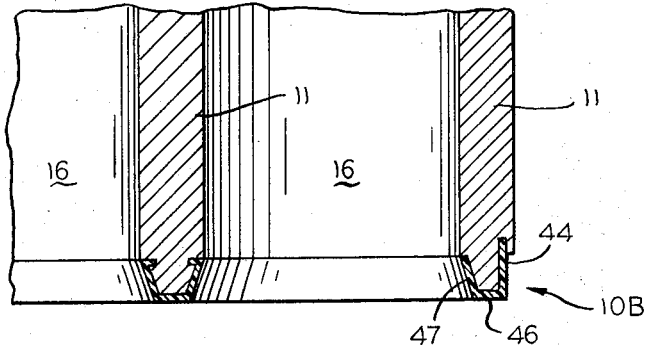
FIG. 8 is an enlarged section through the spigot end of the section showing details of the insert thereat.

Referring now particularly to FIGS. 3 and 8, the spigot end insert 10B has a peripheral flange 44 and a planar section 46 conforming generally in area to the cross-sectional area of the concrete section seen. Insert 10B has frusto-conical extensions 47 from the planar surface 46 extending into the bore 16 formed in the concrete section 11, such frusto-conical sections 47 conforming to the tapered surface 24 of the pressure platen 22.

It will be seen that both the bell insert 10A and the spigot end insert 10B provide tapered or chamfered ends to the bores 16. The inserts, being moulded integrally with the concrete section 11, and embedded therein, make it unnecessary to grind the ends of the bores 16 for the smooth passage of lead or other sheathed cable disposed within the bores 16, thereby avoiding injury to same. It may be noted that in the moulding process when the upper pressure platen 17 and the under pressure member 21 are removed from the bell end of the mould 12 prior to expressing the moulded section from the mould 12, the movement of the lower pressure platen 22 and the transfer platen 27 disposed thereon provides very smooth bores 16 in the section 11.

At the conclusion of the expressing operation, the transfer platen 27 with the moulded piece 11 disposed thereon may be lifted from the lower pressure platen 22 by means of tines of a lifting fork, not disclosed, and shown in said Gagne patents.

Figure 9:
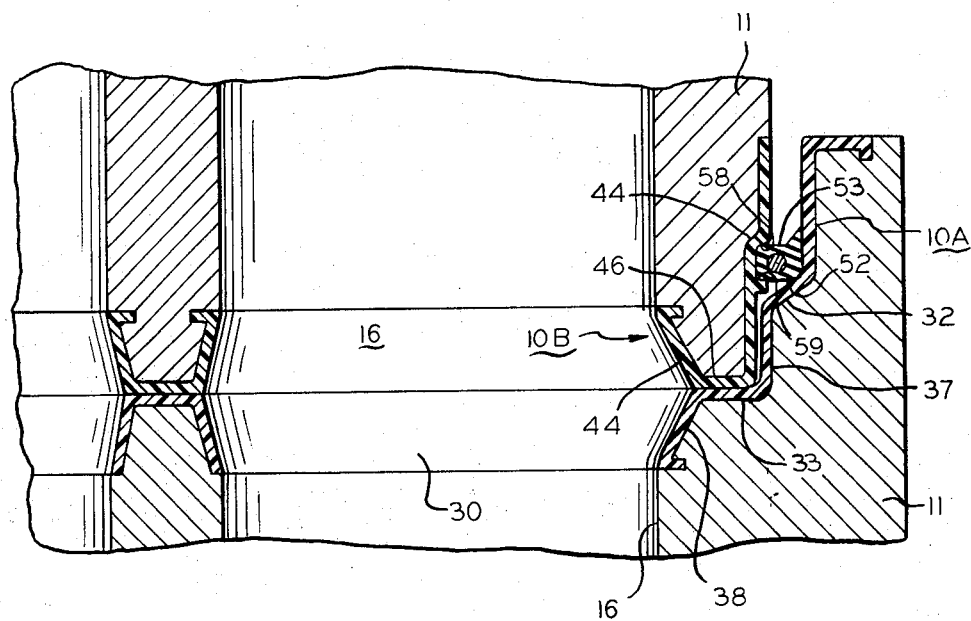
FIG. 9 is a detailed transverse sectional view to an enlarged scale showing details of a joint made between the bell and spigot sections.
Figure 10:
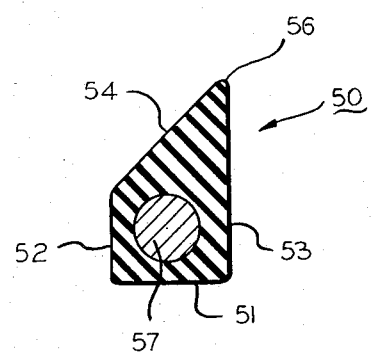
FIG. 10 is a transverse sectional view through a sealing member adapted to be interposed between the bell and spigot sections of FIG. 9.

As seen in FIG. 9, structure is provided for securing a gasket 50 in position on the spigot end insert 10B. Gasket 50 is essentially trapezoidal in cross section with a base 51, a short side 52 extending normal to base 51, a long side 53 extending normal to base 51, and a closing side 54 extending obliquely to base 51 to define a sealing lip 56 with long side 53. Gasket 50 is moulded integrally with a reinforcing ring 57.

Gasket 50 is held between a pair of spaced lands 58 and 59 formed in flange 44 of insert 10B, the two lands preventing gasket 50 from rolling on insert 10B as the sections are brought "home." In the placement of gasket 50 reinforcement 57 is stressed to hold the same tightly on insert 10B. Closing side 54 is deformed as seen in such closing.

The structure disclosed herein makes it possible to join the sections 11 as seen in FIG. 4 and to seal them tightly against the ingress of water when the sections are laid in a trench and buried therein.

We claim:

1. An improved joint for concrete conduit sections of the type where each section has a bell end and a spigot end and wherein said spigot end of one section is received within the bell end of a contiguous section, each of said sections having a plurality of ducts therethrough from end to end, the ducts of one conduit section being in alignment with the ducts of the other conduit section when the sections are assembled in end-to-end relationship, the improvement which comprises:

a. a first premoulded article cast with the bell end of each section, said article including
    i. a first body member including a planar section conforming in area to the cross-sectional area of said concrete section at the bell end thereof;
    ii. extensions from said first body member having inner surfaces thereon defining frusto-conical sections in said ducts at the ends thereof adjacent said bell end;
  b. a second premoulded article cast with the spigot end of each section, said article including
    i. a second body member including a planar section conforming in area to cross-sectional area of said concrete section at the spigot end thereof;
    ii. extensions from said second body member having inner surfaces defining frusto-conical sections in said ducts at the ends thereof adjacent said spigot end;
  c. sealing means disposed between said bell and spigot sections whereby said ducts are sealed against the ingress of water or the like and whereby a cable may be moved in a duct through said first and second premould articles without interference.

2. An improved joint according to claim 1 wherein said second body member has a pair of spaced lands on the exterior surface for locating said sealing member and holding same in position when a pair of contiguous bell and spigot ends are brought "home."

3. An improved joint according to claim 2 wherein said sealing means has a base disposed between said spaced lands and sides extending normal thereto and in contact with said spaced lands.

4. An improved joint according to claim 3 wherein said sealing means has an oblique surface extending between said normal extending sides, said oblique surface being distorted when said bell and spigot ends are brought "home."

* * * * *